United States Patent
Meinig

(10) Patent No.: US 7,464,453 B2
(45) Date of Patent: Dec. 16, 2008

(54) PROCESS FOR BUTT JOINING TWO PIPE SEGMENTS AND PRODUCING A CONNECTING FLANGE

(75) Inventor: Manfred Meinig, Rietheim-Weilheim (DE)

(73) Assignee: METU-System Meinig KG, Rietheim-Weilheim (DE)

( * ) Notice: Subject to any disclaimer, the term of this patent is extended or adjusted under 35 U.S.C. 154(b) by 163 days.

(21) Appl. No.: 11/381,306

(22) Filed: May 2, 2006

(65) Prior Publication Data

US 2006/0186665 A1    Aug. 24, 2006

Related U.S. Application Data

(63) Continuation of application No. 10/407,358, filed on Apr. 4, 2003, now Pat. No. 7,073,826.

(30) Foreign Application Priority Data

Apr. 5, 2002    (DE)    ................... 102 15 112

(51) Int. Cl.
  *B23P 11/00*    (2006.01)
  *B21D 39/00*    (2006.01)
  *F16L 23/00*    (2006.01)
(52) U.S. Cl. .............. 29/505; 29/509; 29/512; 403/274; 403/282; 403/285; 285/364; 285/406
(58) Field of Classification Search .......... 29/505, 29/509, 512, 513, 516; 285/364, 365, 406, 285/407, 408, 424; 403/274, 282, 285
See application file for complete search history.

(56) References Cited

U.S. PATENT DOCUMENTS

| | | | |
|---|---|---|---|
| 1,225,478 A | | 5/1917 | Murray |
| 3,239,931 A | * | 3/1966 | Guarnaschelli ............ 29/520 |
| 3,744,115 A | * | 7/1973 | West ................... 29/243.518 |
| 3,889,581 A | | 6/1975 | Bray, Sr. |
| 4,466,641 A | | 8/1984 | Heilman et al. |
| 4,542,923 A | | 9/1985 | La Crosse et al. |
| 4,566,724 A | | 1/1986 | Arnoldt et al. |
| 4,809,418 A | * | 3/1989 | Burli ........................ 29/237 |

(Continued)

FOREIGN PATENT DOCUMENTS

DE    3537504 C1    7/1987

(Continued)

*Primary Examiner*—Jermie E Cozart
(74) *Attorney, Agent, or Firm*—Akerman Senterfitt; Gregory A. Nelson; Peter A. Chiabotti

(57) ABSTRACT

A process is provided for producing a connecting flange (32) for a butt joint on an end of a pipe section (10) of sheet metal with circular or oval cross section. The process includes sliding a pipe piece over the outer side of a pipe section (10), so that the pipe piece forms on the outer side of the pipe section (10) a reinforcing ring (47) lying flush against the pipe section (10) and bending the one end of pipe section (10) and the end of the reinforcing ring lying thereupon, from the pipe wall (12) outwards, to form a projecting ring rim (14) in the pipe section (10) and to form a flank (44) in the reinforcing ring (47). The flank (44) of the reinforcing ring (47) can lie against at least the radially inner part of the projecting ring rim (14), thereby forming the connecting flange.

8 Claims, 8 Drawing Sheets

U.S. PATENT DOCUMENTS

| | | |
|---|---|---|
| 4,822,083 A | 4/1989 | Meinig |
| 4,823,908 A | 4/1989 | Tanaka et al. |
| 4,865,365 A | 9/1989 | Meinig |
| 5,015,018 A | 5/1991 | Arnoldt |
| 5,129,690 A | 7/1992 | Meinig et al. |
| 5,133,580 A | 7/1992 | Meinig |
| 5,673,947 A | 10/1997 | De Waal |
| 6,109,665 A | 8/2000 | Meinig |
| 6,412,519 B1 | 7/2002 | Goodhue |
| 6,547,287 B1 | 4/2003 | Shah et al. |
| 6,584,205 B1 | 6/2003 | Croft, III et al. |
| 6,850,623 B1 | 2/2005 | Norris et al. |
| 7,073,826 B2 | 7/2006 | Meinig |
| 2002/0041099 A1 | 4/2002 | Grun |
| 2004/0089043 A1 | 5/2004 | Meinig |

FOREIGN PATENT DOCUMENTS

| | | |
|---|---|---|
| DE | 100 47 310.5 | 5/2002 |
| EP | 0025070 A1 | 3/1981 |
| EP | 0100580 A1 | 2/1984 |
| EP | 0616162 A1 | 9/1994 |
| GB | 561684 | 5/1944 |
| JP | 61048695 | 3/1986 |
| JP | 9189387 | 7/1997 |

* cited by examiner

PROCESS FOR BUTT JOINING TWO PIPE SEGMENTS AND PRODUCING A CONNECTING FLANGE

CROSS REFERENCE TO RELATED APPLICATIONS

This application is a continuation of U.S. patent application Ser. No. 10/407,358, filed Apr. 4, 2003, now U.S. Pat. No. 7,073,826, B2 the entirety of which is herein incorporated by reference.

BACKGROUND OF THE INVENTION

1. Field of the Invention

The invention concerns processes for the production of butt joints.

2. Description of the Related Art

A butt joint of this type is known from EP 868 624 B1. In these known butt joints a connecting flange is formed unitarily, as one piece, in the material of the pipe end of each of the respective abutting pipe ends. In comparison to connecting flanges seated separately upon the pipe ends, such a design has great advantages, such as 0-leakage, low flow resistance and low noise generation, as well as improved ability to clean and improved hygiene, as a consequence of their flat internal walls. For these advantages one must however accept the following disadvantages. By the one piece forming on of the connecting flange, the wall thickness and therewith the stability of the connecting flange is necessarily correlated with the wall thickness of the pipe itself. If then higher demands are placed upon the stability of the flange connection, this can not be achieved without increasing the wall thickness of the pipe segment over its entire length, even though this thickening of the pipe itself was not even necessary. In the case of connecting flanges seated upon the pipe end, the wall thickness thereof accordingly also always represents a multiple of the pipe wall thickness.

This increasing of the wall thickness over the entire pipe length doubtless represents a great economical disadvantage, since the material costs represent a large proportion of the cost of manufacture of the pipe. There are also technical disadvantages, since the greater pipe wall thickness represents a greater pipe weight and this weight places greater stresses upon the suspension and the flange connection. The formed-on connecting flanges are often subjected to a strong axial pull-forces. Most often this occurs with vertical running pipelines, however it also occurs in horizontal pipelines as a consequence of the respectively selected separation between two sequential suspensions or free lengths of the pipe. In the case of strong axial pull-forces on a butt joint with connecting flanges formed as one piece on the pipes, it is often the curve apex (area at which the connecting flange and the straight pipe join) which is the weakest point. Upon overloading, there results therewith at this point a conical gap between the contacting connecting flanges. Such a gap destroys any advantage of the formed-on connecting flanges. The pipeline inner surface is no longer continuously flat or flush at this gap location. Fibers and dirt can collect and build up at the gap. Thereby the flow resistance, the noise formation and the ability to clean are made worse. Further, a greater leakage can only be prevented when a seal is applied to the outer flange edge. A pretensioning of the connecting flange by a stronger bending of the ring shaped flange part projecting from the flange beyond 90° brings about only a limited improvement of the flange stability.

This weakness can naturally be improved with the known, relatively new technique of "Tailored Blanks". When using this technique short pipe pieces of thicker material can be welded to the ends of the pipe sections and the connecting flange can be formed therefrom. This possible embodiment is however completely uneconomical, since it would already be much simpler to weld on an already completely finished bent connecting flange.

SUMMARY OF THE INVENTION

According to the invention, a butt joint of the above-described type is to be so improved, that the flange thickness and pipe wall thickness can be decoupled and thereby the advantages of the formed-on connecting flange can remain unimpaired.

According to the invention the connecting flange formed directly onto the end of the pipe as one piece can be thickened in very simple manner, without increasing the sheet metal thickness of the pipe segment, essentially by sliding onto the outer side of the pipe a pipe-piece forming a reinforcing ring. Only after the sliding-on of the reinforcing pipe-piece is the connecting flange formed onto the pipe end together with the reinforcing ring. The result is a two-layer formed-on flange. Since the thickness of the reinforcing ring can be so selected on a case-by-case basis that the flange strength required for the particular application is ensured, there occurs an enormous material savings in comparison to having to thicken the pipe wall over the entire length. Following the forming of the connecting flange with reinforcing ring, the flange layer formed from the pipe wall always lies on the outside, so that the advantages, such as 0-leakage, flat pipe inner wall and flat flange surface, remain. The reinforcing ring need be selected in its thickness essentially on the basis such that even in the case of increased axial pull forces no gap between the connecting flanges can result.

The economy when using the invention results essentially from the great material savings, when the thickness of the pipe wall does not have to be increased. With relatively small additional effort, the reinforcing ring can be produced of sheet metal and slid onto the not-yet-processed pipe end. The forming on of the one pipe connecting flange, inclusive of the seated-on reinforcing ring, can be carried out without problem preferably by the so-called circular-pivot-bending process according to DE 100 47 310.5 even in the case of the strongest reinforcing ring.

The possibility of varying the reinforcement of the connecting flange without at the same time increasing the pipe wall thickness opens many new employment possibilities for the inventive butt joint. A number of preferred embodiments of the invention are thus placed under protection in the dependent claims. In particular the various designs of the connecting flange can be accomplished, for example with clamping surface running for example parallel to the pipe wall or conically, with one or more reinforcing rings, which can lie against various parts or against the entire connecting flange. It is in principle also possible that the pipe and reinforcing rings can be made of different materials, for example the pipe of aluminum sheet metal and the reinforcing ring of zinced steel or the like.

BRIEF DESCRIPTION OF THE DRAWING

Various embodiments of the inventive butt joint are described in greater detail on the basis of the figures. There is shown.

DETAILED DESCRIPTION OF THE INVENTION

In all figures the identical or similar parts are indicated with the same reference numbers.

Figure 1:
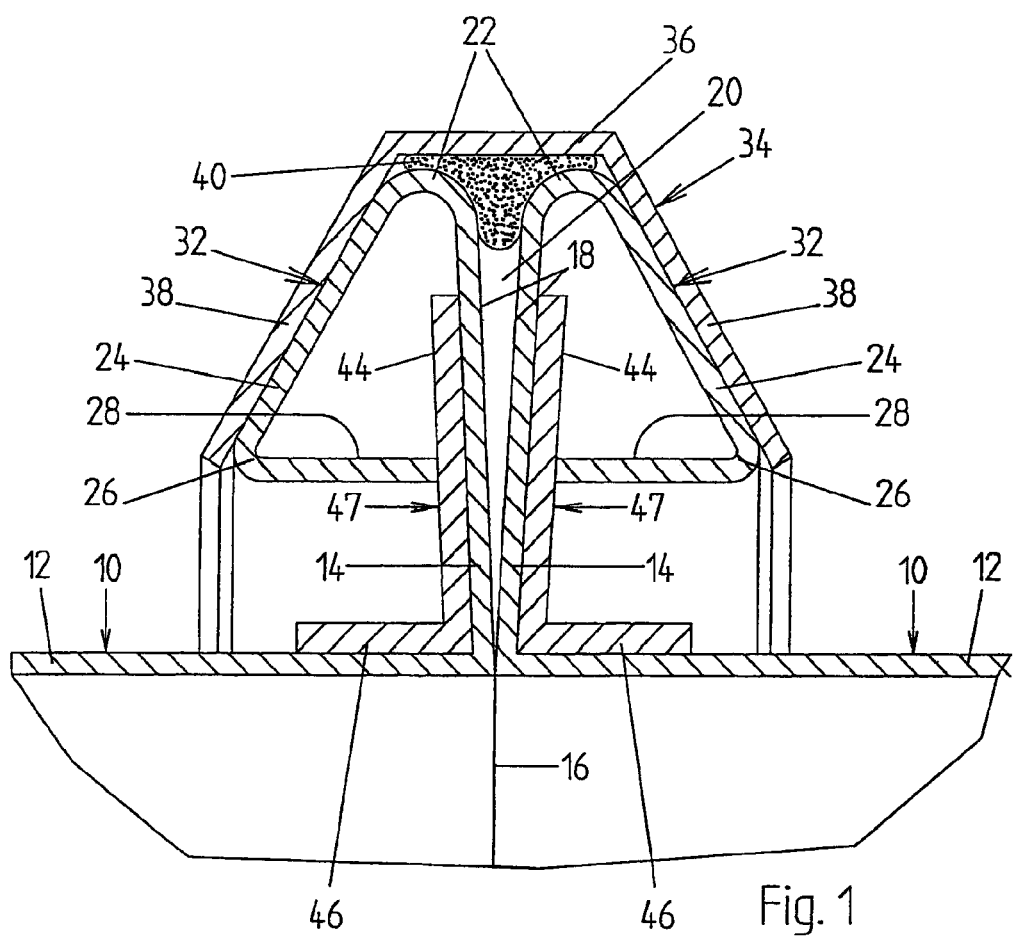
FIG. 1 an axial partial section through an inventive butt joint following the tightening of a clamp ring seated upon the connecting flanges, FIG. 2 a diagonal view of one end of a pipe segment and a pipe piece forming the reinforcing ring prior to the sliding thereof onto the pipe end, FIG. 3 a diagonal view according to FIG. 2 following the sliding on of the reinforcing ring upon the pipe end, FIG. 4 an axial section of the pipe end and reinforcing ring following the formation of a clamping wall or flank bent conically towards the pipe wall, FIG. 5 an axial segment according to FIG. 4 following the formation of an outwardly projecting ring rim of the connecting flange, FIGS. 6 through 13 various embodiments of a connecting flange formed one piece onto a pipe wall in axial section as well as FIGS. 14 through 17 axial sections through double wall pipe segments with connecting flange formed one-piece by the pipe ends of the inner pipe wall or, as the case may be, with the outer reinforcing flange formed by the reinforcing ring pipe wall.

As can be seen from FIG. 1, the shown butt joint 2 generally comprises two pipe segments indicated with reference number 10 of sheet metal with respectively one channel wall 12. On the contacting ends each pipe wall 12 transitions in a sharp as possible angle to an outwardly projecting ring rim 14, which forms an angle together with the pipe wall 12 of somewhat less than 90°, preferably 87 to 89°. If the inner ends of the ring rim 14 lie tight against each other in the area of the pipe wall 12 along a narrow juncture 16, there forms between the faces 18 of the two ring rims 14 a wedge shaped gap 20, which widens radially outwardly.

The outer end of each ring rim 14 transitions via a rounded area 22 respectively into a conical clamping flank 24 angled backwards and directed inwards towards the associated pipe wall 12. The inner end of each clamping flank 24 lying close to the pipe wall 12 transitions via a rounding off 26 respectively into a support flank 28 running spaced apart from the pipe wall 12 and parallel thereto and running towards the ring rim 14. On the outer side of each ring rim 14 or as the case may be on the outer side of each pipe wall 12 there lies respectively one outwardly projecting flank 44 or as the case may be parallel to the pipe wall 12 running flank 46 of an angled-off reinforcing ring 47, made of thicker sheet metal than the pipe wall 12.

The connecting flanges 32 lying against each other are pulled towards each other and placed under tension by a generally ring-shaped clamping ring 34 with channel-shaped cross-section and by tightening of the clamping ring 34, so that the pipe walls 12 are pressed axially tightly against each other along joint 16. The clamping of the clamping ring can occur rapidly in known manner, for example by tightening of a single screw. The clamping ring 34 shown in FIG. 1 includes a channel floor 36 as well as two conical side flanks 38, of which the conicity corresponds to the conicity of the clamping flanks 24 and which thus lie pressing against the clamping flanks 24 following tightening of the clamping ring 34.

In the illustrated embodiment, an annular strip-shaped elastic seal 40 is secured to the inner side of the channel floor 36, which in the tightened condition of the clamping ring 34 is pressed sealingly in the condition shown in FIG. 1 against the outer side of the rounding off 22 as well as the outer end of the wedge shaped gap 30 between the flanges 18 of the ring rims 14. In addition to the good seal achieved by the strong pressing against each other of the inner ends of the ring rim 14 along the joint 16 there results therewith a sufficient sealing for all practical cases.

Figure 2:
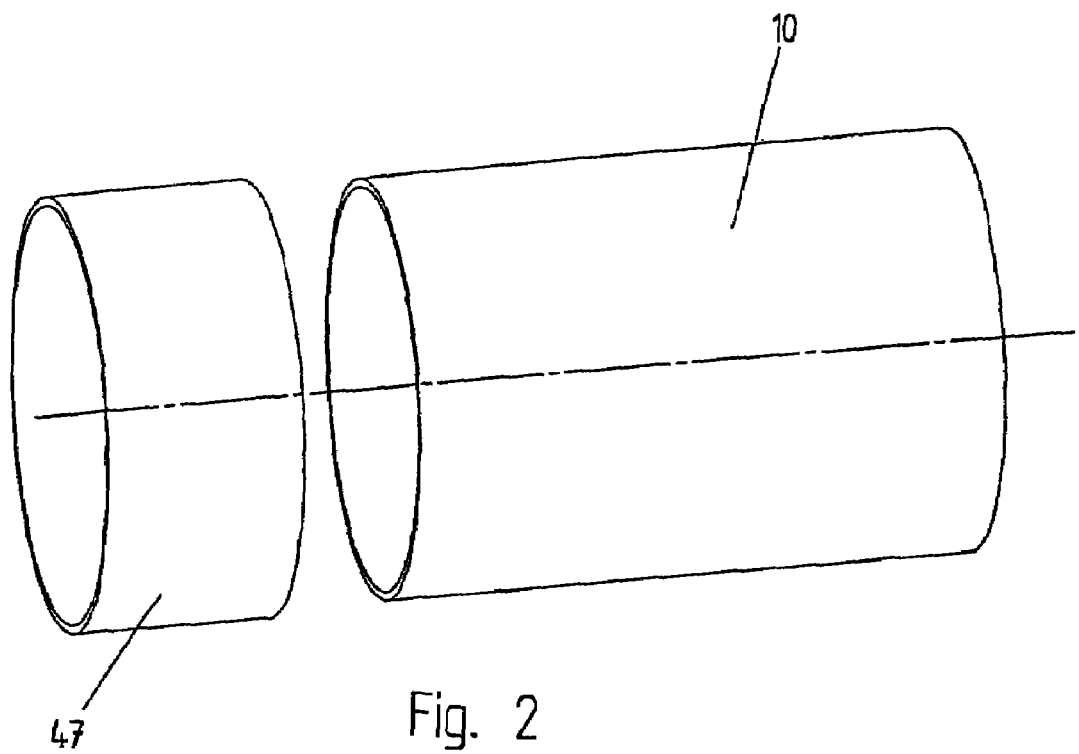
Figure 3:
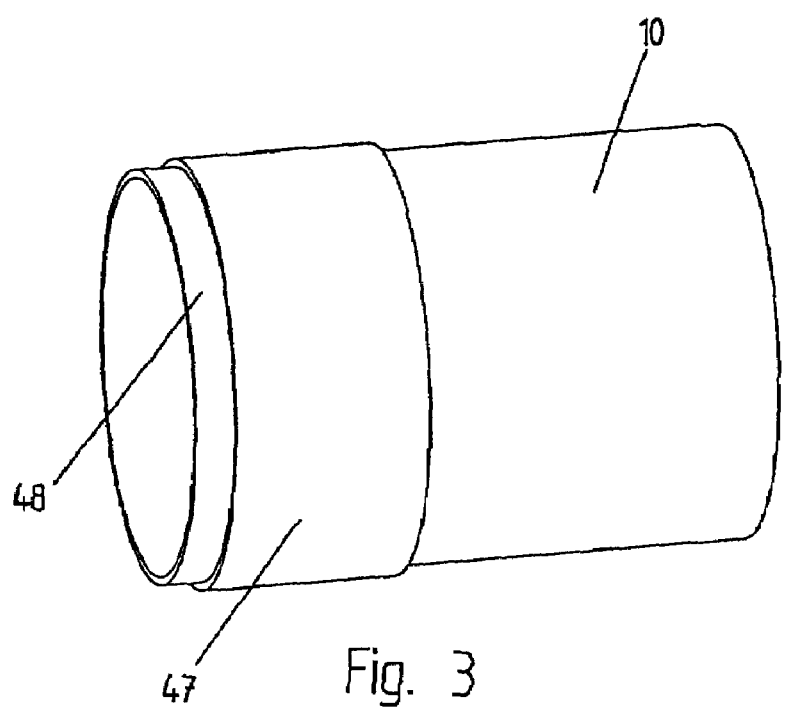
Figure 4:
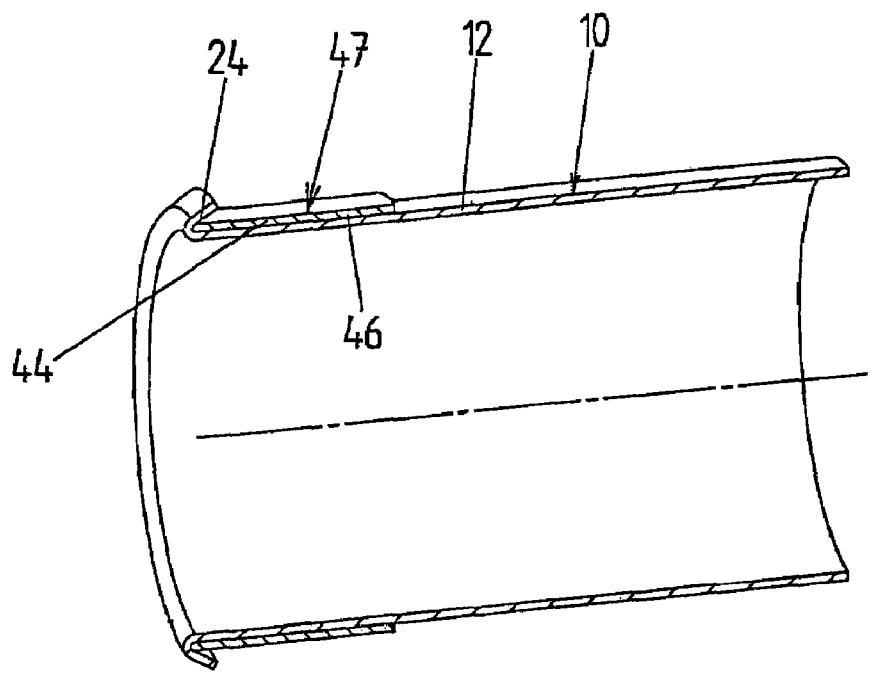
Figure 5:
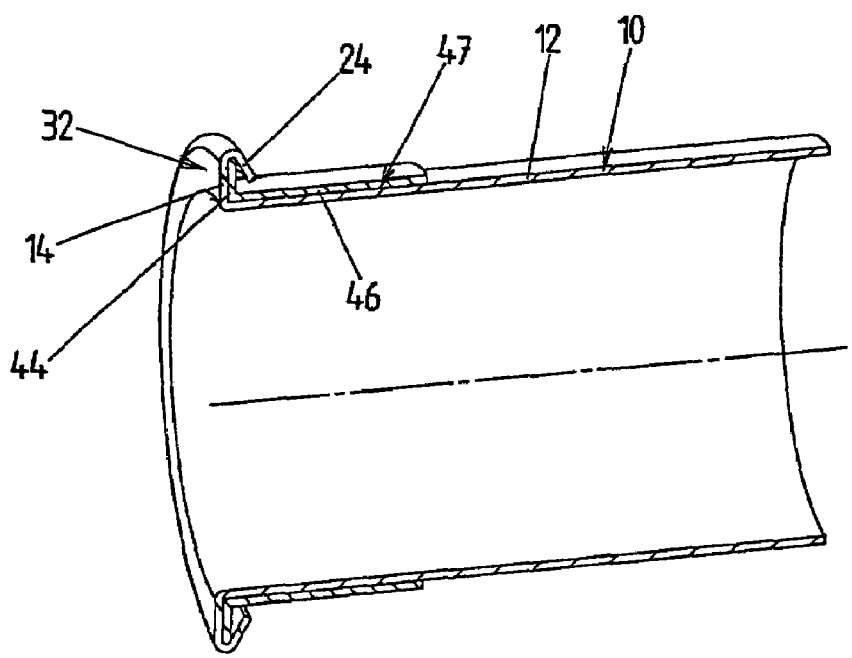

FIG. 2 shows the end of a pipe segment 10 with a short pipe piece 47 to be introduced as reinforcing ring located axially outside the end of the pipe segment 10. FIG. 3 shows the end of the pipe segment 10 following the sliding on of the reinforcing ring 47, which lies continuously tightly against the outer side of the pipe segment 10. During sliding on of the reinforcing ring 47 preferably a ring area 48 projecting axially beyond the reinforcing ring 47 is kept free, which subsequently according to FIG. 4 is bent back conically over the axial end of the reinforcing ring 47 for forming the later clamping flank 24. After reaching the deformation stage shown in FIG. 4, a further bending is carried out, preferably using the known circular-pivot-bending process, as a result of which the outwardly projecting ring rim 14 as well as the there-against lying outwardly projecting flank 44 of the reinforcing ring is formed. The embodiment according to FIGS. 4 and 5 differ from that shown in FIG. 1 essentially thereby, that the flank 46 of the reinforcing ring 47 according to FIGS. 4 and 5 running parallel to the pipe wall 12 is essentially longer in the axial direction than in the embodiment according to FIG. 1.

The longer of the two flanks 44 and 46 can be substantially freely selected, depending only upon situation of employment and strength requirements. The same applies for the respective employed shape of the formed-on connecting flange. Thus, for example, in the case of the embodiment according to FIG. 6 the outwardly projecting shank 44 of the reinforcing ring is selected to be just so long, that it lies completely against the outer side of the ring rim 14 and the clamping flank 24 of the connecting flange is bent tightly about the outer end of the flank 44. A supplemental support flank 28, which is provided according to FIG. 1, is omitted in the embodiments according to FIGS. 4 through 7.

Figure 7:
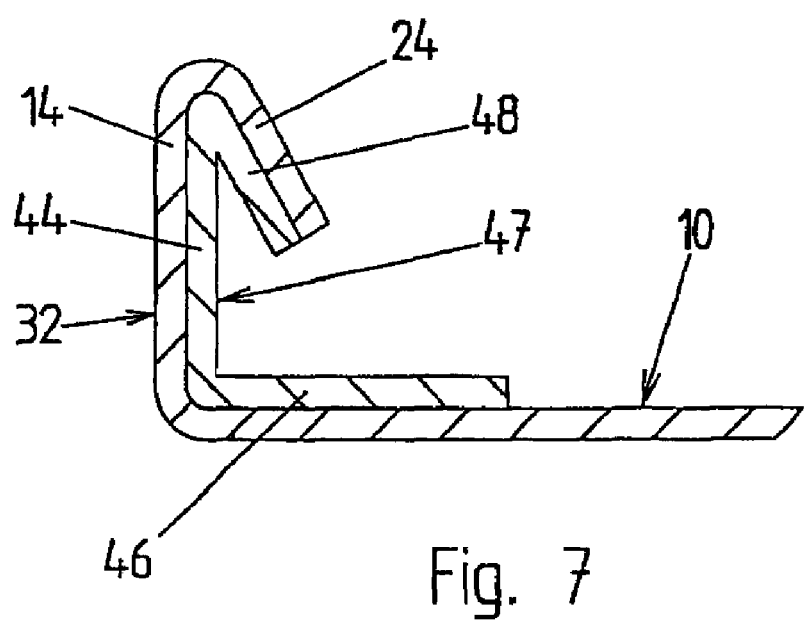

FIG. 7 shows a particularly simple embodiment, in which the sheet metal thickness of the reinforcing ring 47 is smaller than or at most equal to the sheet metal thickness of the pipe segment 10. In this embodiment there is additionally a third flank 48 of the reinforcing ring 47 lying flush conically against the inwardly bent clamping flank 24, and which is formed together with the clamping flank 24.

Figure 8:
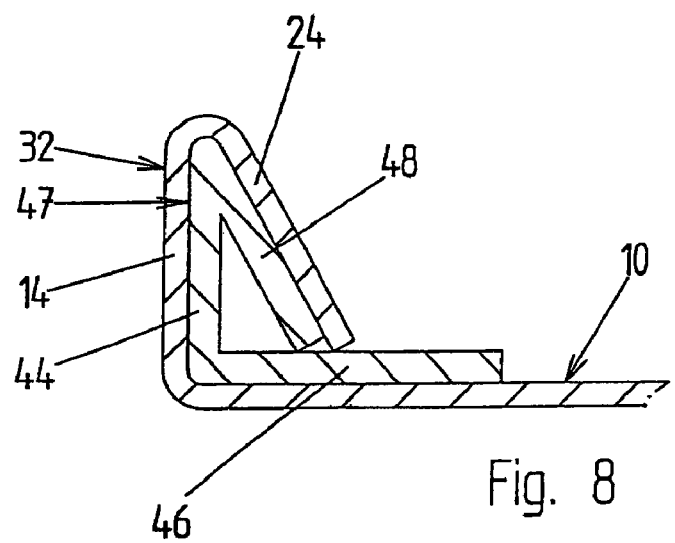

FIG. 8 shows an embodiment similar to the embodiment according to FIG. 7, wherein the sheet metal thickness of the reinforcing ring is again somewhat increased with respect to the sheet metal thickness of the pipe segment 10. In addition, here the clamping flank 24 of the connecting flange, together with the flank 48 of the reinforcing ring lying against it, are drawn so far inwards against the wall of the pipe segment 10, that both lie against the outer side of the flank 46 of the reinforcing ring. From this, there results a particularly stable embodiment.

Figure 6:
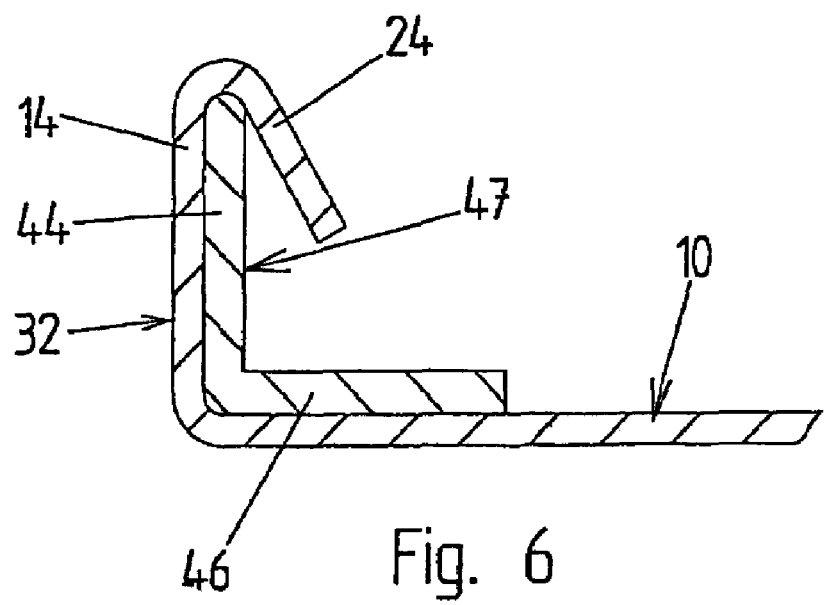
Figure 9:
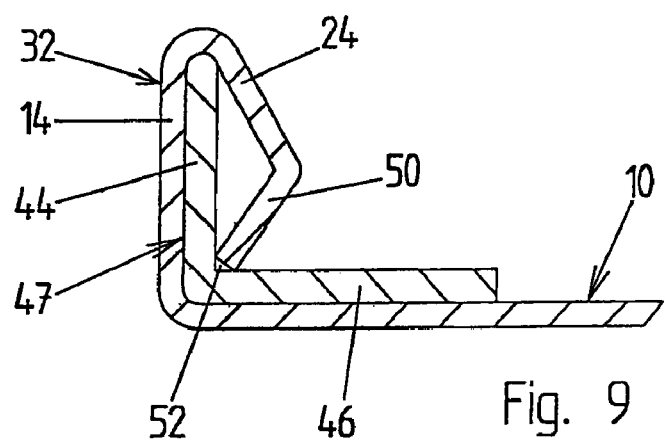

In the embodiment according to FIG. 9 the flank 44 of the clamp ring is formed in the same manner as in the embodiment according to FIG. 6, while the clamp flank 24 includes a bent flank segment 50, so that the inner end of the bent flank segment 50 lies supported in the joint or fold 52 between the two flanks 44 and 46 of the reinforcing ring 47.

Figure 10:
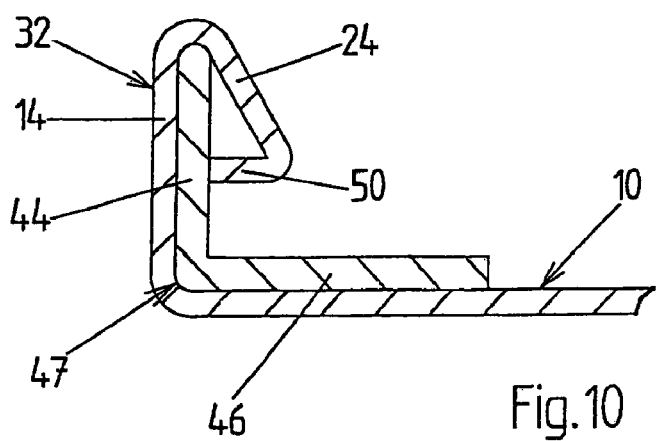

In a further embodiment according to FIG. 10, the bent flank segment 50 of the clamping flank 24 is bent parallel to the wall of the pipe segment 10, so that it supports itself approximately in the center of the flank 44 of the reinforcing ring 47.

Figure 11:
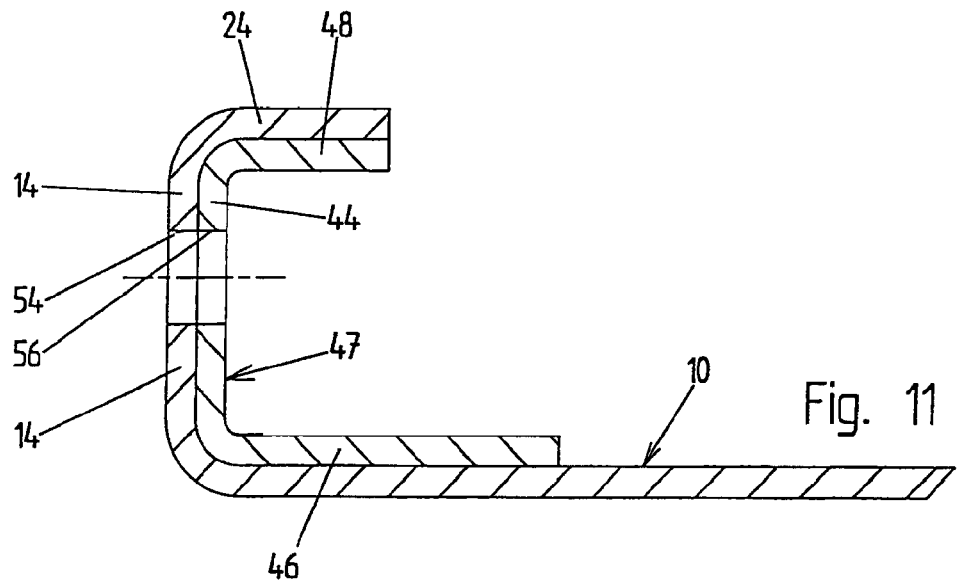
Figure 12:
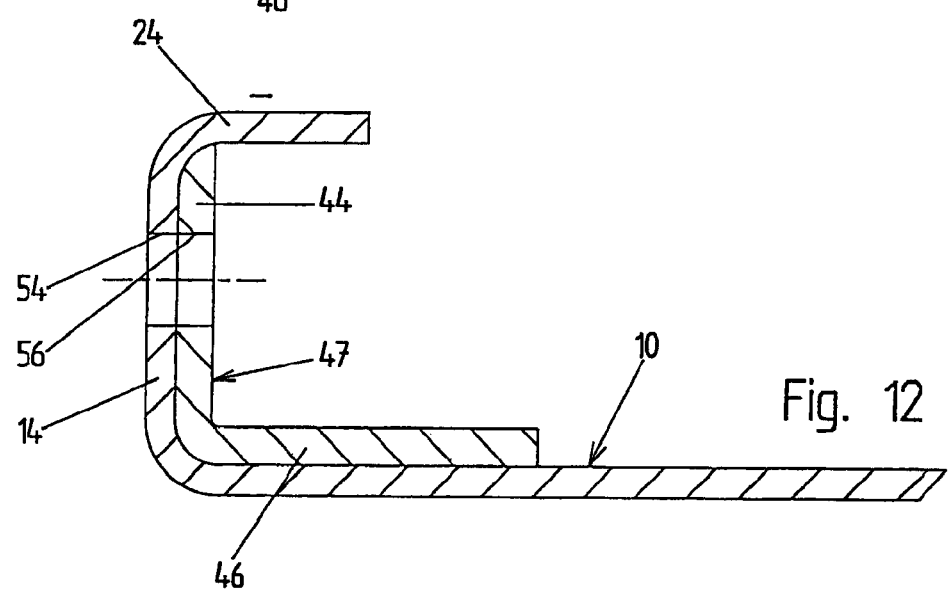
Figure 13:
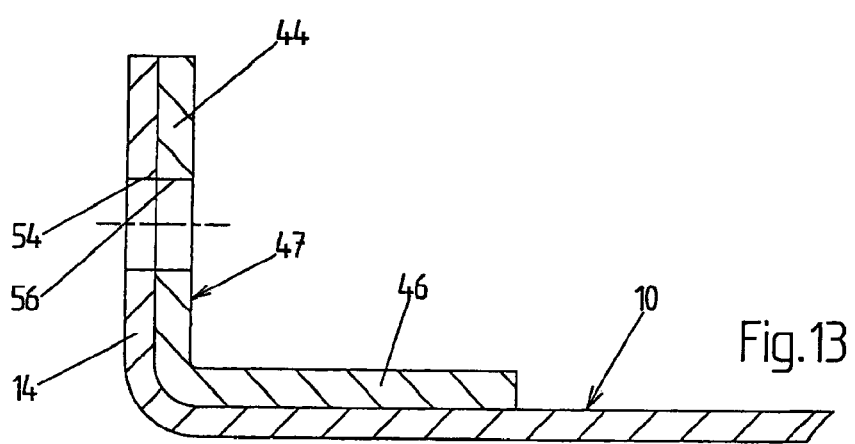
Figure 14:
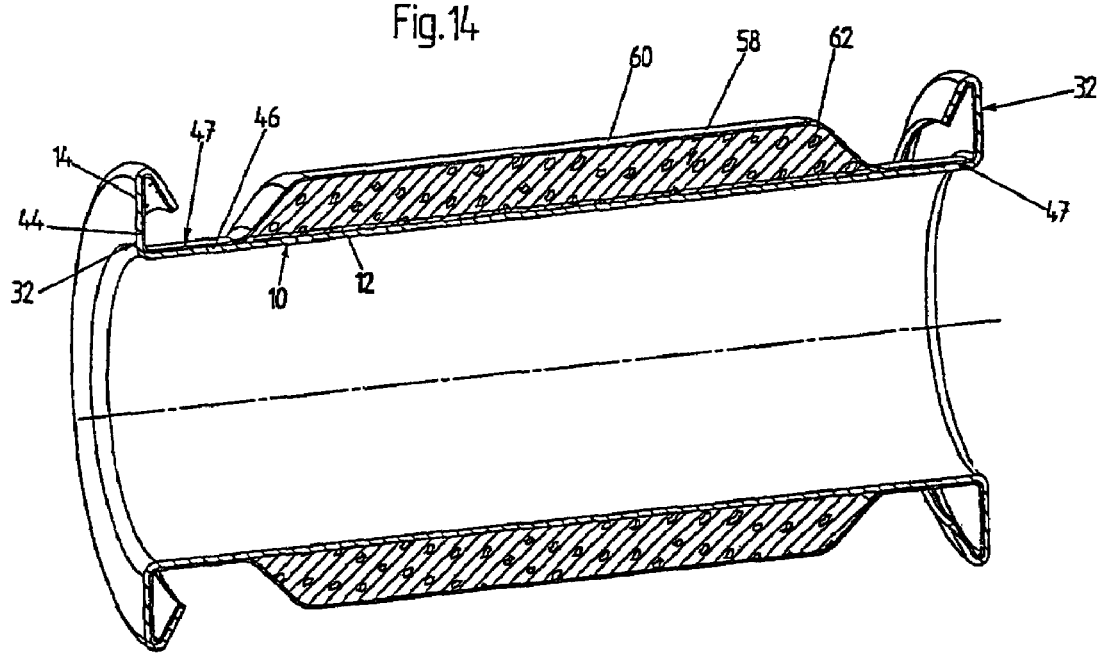

Simpler embodiments of the connecting flange 32 with reinforcing ring 47 are shown in FIGS. 11 through 13. In these embodiments the fastening of the two connecting flanges does not occur via a clamping ring, as shown in FIG. 1, but rather by a not shown screw fastener, which extends in known manner through aligned screw holes 54 or as the case may be 56 in the ring rim 14 or as the case may be flank 44 of the reinforcing ring 47. The flank 24 corresponding to the clamp shank and the there-against lying flank 48 of the reinforcing ring 47 lie in this embodiment parallel to the pipe wall of the pipe segment 10. By the elimination of a specific clamping ring there results therefrom again a further weight reduction in relation to the above-described embodiments.

The embodiment according to FIG. 12 is somewhat heavier and accordingly more solid, wherein the sheet metal strength of the reinforcing ring 47 is selected to be again somewhat greater. The reinforcing ring thus exhibits essentially an outwardly directed flank 44 and no backwards-bent flank 48.

FIG. 13 shows a particularly simple embodiment for screw connection, wherein the connecting flange has only a ring rim 14 as well as the reinforcing ring having only a flank 44 lying against the ring rim. For many applications such a simple and therewith light embodiment is sufficient. The reinforcing ring 47 can naturally be produced in a wide range of freely selected strengths.

Embodiments, wherein the reinforcing ring 47 extends over the entire length of the respective pipe segment or wherein two or more reinforcing rings are superimposed upon each other at the pipe end may not be shown in the figures, however can in extreme cases represent a suitable design within the framework of the patent claims, where particular strength requirements must be met or where the weight of the pipe segment is not a factor.

Particularly advantageous embodiments are produced when the respective pipe segment 10 is a double wall formed by the extension of the reinforcing ring 47 along the entire axial length of the pipe segment 10, in particular when, as shown in the embodiments according to FIGS. 14 through 17, the reinforcing ring 47 is distanced from the pipe wall 12 along the greater part of the axial length of the associated pipe segment, so that an intermediate space 58 results between the pipe wall 12 and the associated segment 60 of the reinforcing ring. This intermediate space 58 can be filled with sound absorbing material 62 for forming a tubular silencer. In the application as a silencer, the pipe wall 12 is provided with holes. The material 62 can for example be glass wool or the like.

Figure 15:
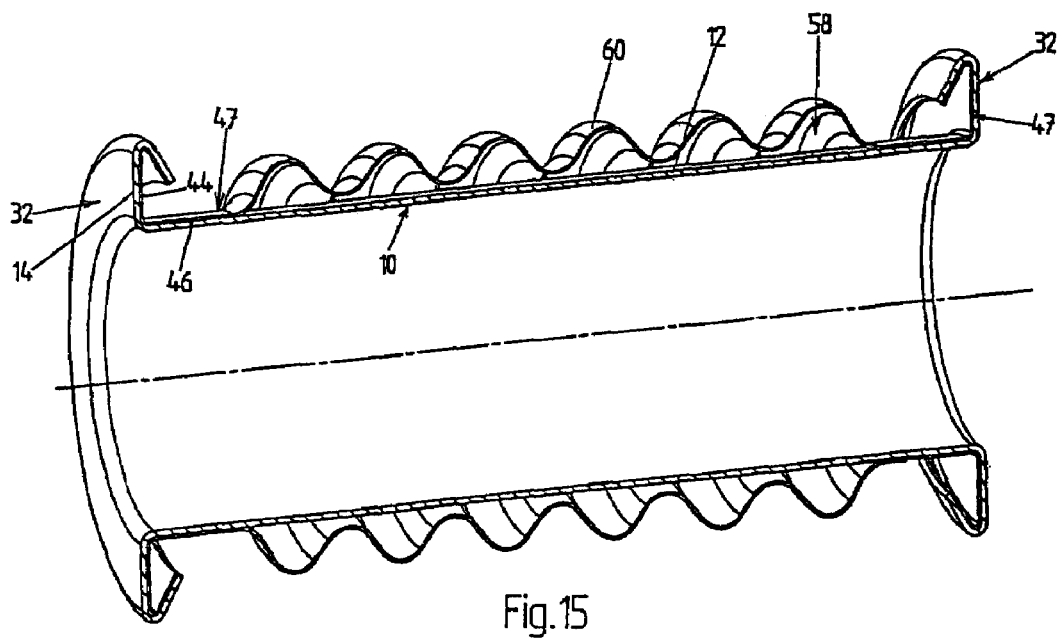

FIG. 15 shows an embodiment of a pipe segment 10 which is suitable as a sheet metal pipe particularly for subterranean employment, in which the segment 60 of the reinforcing ring 47, which runs spaced apart from pipe wall 12, is corrugated in the longitudinal direction of the pipe segment 10. Due to the necessary rust resistance, the pipe segment 10 and/or the reinforcing ring 47 are made of zinced steel or the like material. The corrugated pipe in particular serves for receiving the occurring pressure.

Figure 16:
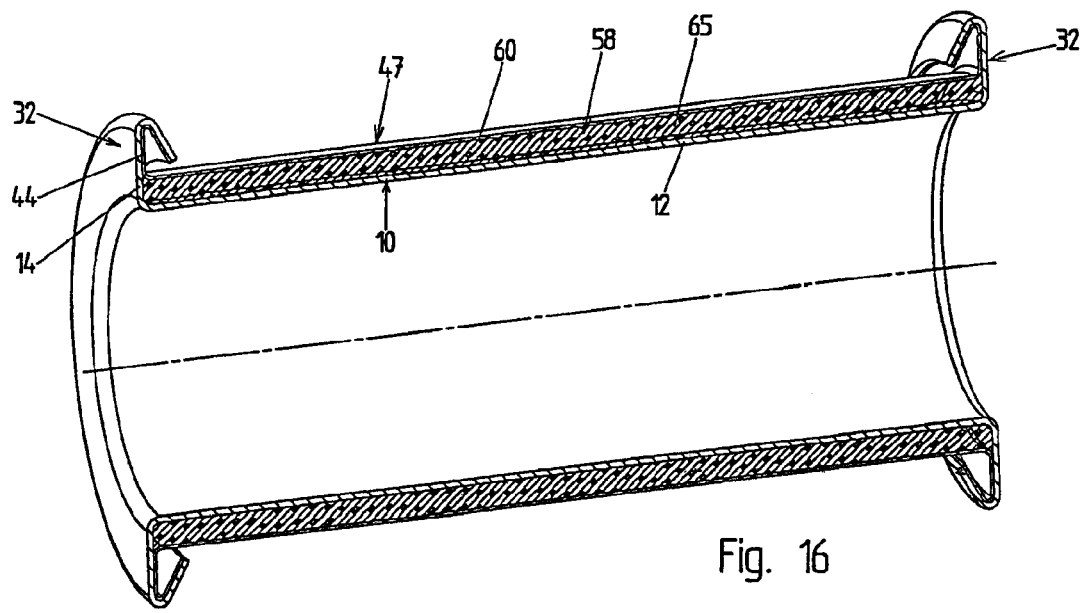

In the embodiment according to FIG. 16 the intermediate space 58, which extends practically along the entire length of the pipe segment 10, is filled with insulating material 56. A segment 46 of the reinforcing ring 47 lying against the pipe wall 12 is not envisioned in this embodiment.

Figure 17:
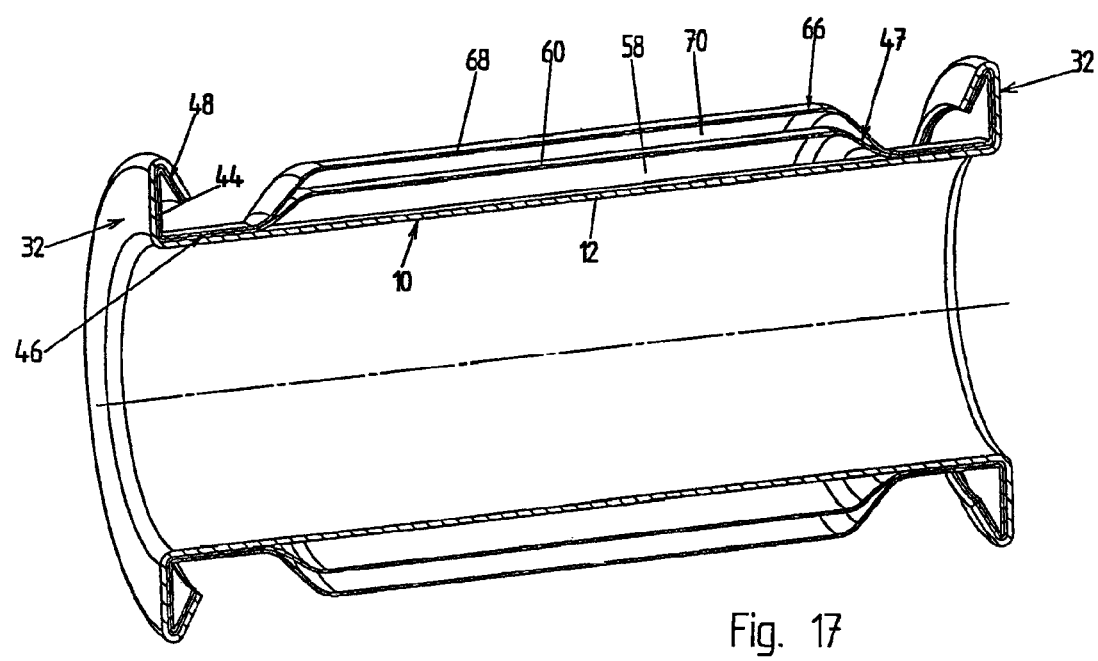

Finally in the embodiment according to FIG. 17 an inner reinforcing ring 47 and an outer reinforcing ring 66 are provided co-axially in such a manner that the segments 60 and 68 respectively extend along the greater part of the longitudinal extension of the pipe segment 10, spaced apart from the pipe wall 12 as well as being spaced apart from each other. Thereby, the two intermediate spaces 58 or, as the case may be, 70, are formed. Bordering on the connecting flange 32 as well as the connecting flanges themselves are thus the flanks 46, 44, 48 lying against the outer side of the connecting flank 32 of the reinforcing ring 47 and 66, which are formed respectively double-walled. Multi-walled pipe segments in the sense of the embodiment according to FIG. 17 can be used for example in chemical process engineering, wherein the individual pipes or as the case may be reinforcing rings can be manufactured of different materials depending upon requirement.

Also in safety engineering multi-walled pipes are necessary, wherein for example the hollow space can be filled with a control fluid. The leakage of the control fluid can be used as an indicator for loss of integrity.

Multi-wall pipes of this type can also be advantageously be employed in refrigeration or air conditioning engineering.

The invention claimed is:

1. A process for producing a connecting flange (32) for a butt joint on an end of a pipe section (10) of sheet metal with circular or oval cross section, the process comprising:
   (a) sliding a pipe piece over the outer side of a pipe section (10), so that the pipe piece forms on the outer side of the pipe section (10) a reinforcing ring (47) lying flush against the pipe section (10),
   (b) bending said end of pipe section (10) and an end of the reinforcing ring lying thereupon, from a pipe wall (12) of pipe section (10) outwards, to form a projecting ring rim (14) in the pipe section (10) and to form a flank (44) in the reinforcing ring (47), the flank (44) of the reinforcing ring (47) lying against at least a radially inner part of the projecting ring rim (14), thereby forming the connecting flange
   wherein in step (a) said pipe piece is slid axially over the outer side of the pipe section (10) until an axial segment of the end of the pipe section (10) is exposed, and wherein said exposed end of pipe section (10) is bent from the pipe wall (12) outwards prior to step (b) to form, following step (b), a clamp flank (24).

2. A process according to claim 1, comprising first bending said exposed end of pipe section (10) to thereby form, after step (b), a clamp flank reinforcing flank (48).

3. A process according to claim 1, wherein said bending is by means of a circular pivot bend process.

4. A process for producing a connecting flange (32) for a butt joint on an end of a pipe section (10) of sheet metal with circular or oval cross section, the process comprising:
   (a) sliding a pipe piece over the outer side of a pipe section (10) until an axial segment (24) of the end of the pipe section (10) is exposed, and so that the pipe piece forms on the outer side of the pipe section (10) a reinforcing ring (47) lying flush against the pipe section (10),
   (b) bending said exposed axial segment (24) of pipe section (10) outwards, forming in the pipe section (10) a bent end,
   (c) bending the bent end of pipe section (10) and an end of the reinforcing ring lying thereupon, from a pipe wall (12) of the pipe section (10) outwards, to form a projecting ring rim (14) in the pipe section (10) and a flank (44) in the reinforcing ring (47), thereby forming the connecting flange, whereby the bent exposed axial segment (24) of pipe section (10) forms a clamp flank reinforcing flank (48).

5. A process for joining two pipe sections (10) of sheet metal with circular or oval cross sections, said process comprising:

(a) sliding a pipe piece over the outer side of a pipe section (10), so that the pipe piece forms on the outer side of the pipe section (10) a reinforcing ring (47) lying flush against the pipe section (10), (b) bending an end of pipe section (10) and an end of the reinforcing ring lying thereupon, from a pipe wall (12) of the pipe section (10) outwards, to form a projecting ring rim (14) in the pipe section (10) and to form a flank (44) in the reinforcing ring (47), the flank (44) of the reinforcing ring (47) lying against at least a radially inner part of the projecting ring rim (14), thereby forming a flange end, (c) placing said flange end of said pipe section (10) against a flange end of another pipe section, and (d) connecting said flange ends (32) by a tensioning device for holding the pipe sections together in an axial direction wherein in step (a) said pipe piece is slid axially over the outer side of the pipe section (10) until an axial segment of the end of the pipe section (10) is exposed, and wherein said exposed end of pipe section (10) is bent from the pipe wall (12) outwards prior to step (b) to form, following step (b), a clamp flank (24).

6. A process for joining two pipe sections (10) of sheet metal with circular or oval cross sections, said process comprising:

(a) sliding a pipe piece over the outer side of a pipe section (10) until an axial segment (24) of an end of the pipe section (10) is exposed, and so that the pipe piece forms on the outer side of the pipe section (10) a reinforcing ring (47) lying flush against the pipe section (10), (b) bending said exposed axial segment (24) of pipe section (10) outwards, forming in the pipe section (10) a bent end, (c) bending the bent end of pipe section (10) and an end of the reinforcing ring lying thereupon, from a pipe wall (12) of the pipe section (10) outwards, to form a projecting ring rim (14) in the pipe section (10) and a clamp flank (44) in the reinforcing ring (47), thereby forming a flange end, whereby the bent exposed axial segment (24) of pipe section (10) forms a clamp flank reinforcing flank (48), (d) placing said flange end of said pipe section (10) against a flange end of another pipe section, and (e) connecting said flange ends (32) by a tensioning device for holding the pipe sections together in an axial direction.

7. A process according to claim 6, wherein the tensioning device is comprised of screw fasteners extending through openings (54, 56) of adjacent ring rims (14).

8. A process according to claim 7, wherein the screw fasteners extend through a reinforcing flange of the ring rims.

* * * * *